UNITED STATES PATENT OFFICE.

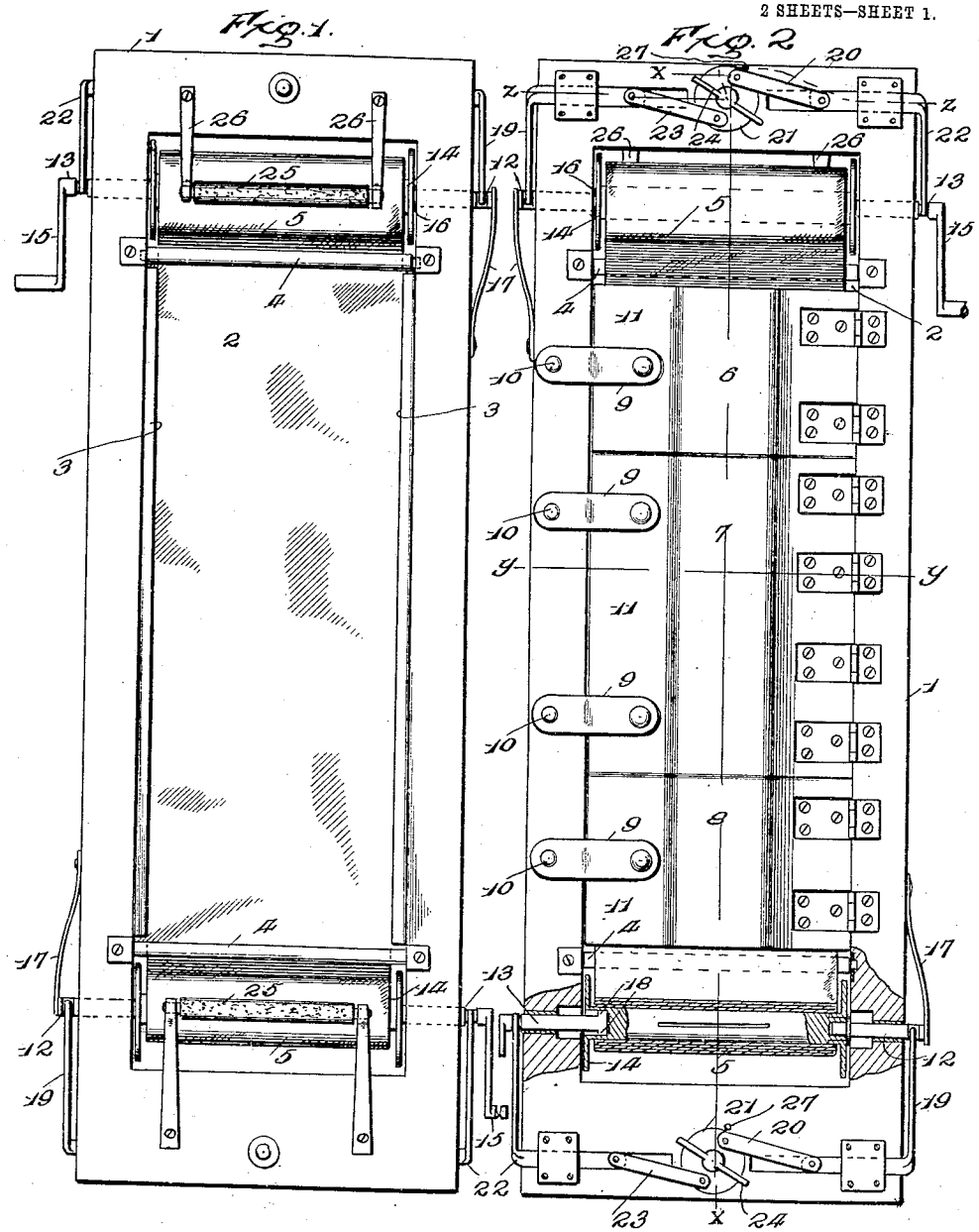

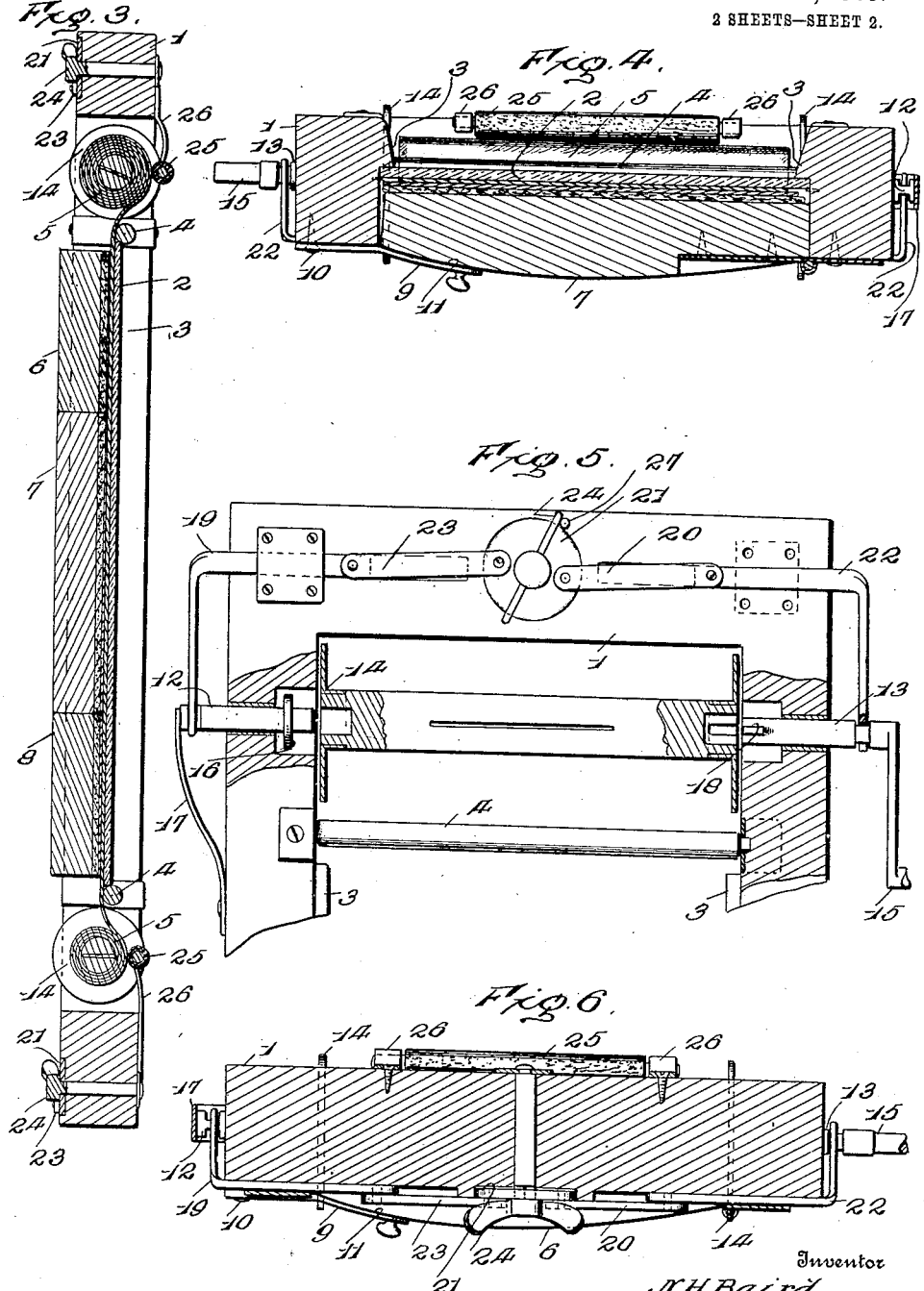

NEWTON H. BAIRD, OF ELIZABETH, COLORADO.

PRINTING-FRAME.

No. 912,524.  Specification of Letters Patent.  Patented Feb. 16, 1909.

Application filed January 6, 1908. Serial No. 409,524.

*To all whom it may concern:*

Be it known that I, NEWTON H. BAIRD, citizen of the United States, residing at Elizabeth, in the county of Elbert and State of Colorado, have invented certain new and useful Improvements in Printing-Frames, of which the following is a specification.

The purpose of the present invention is to devise a frame designed most especially for printing from films in the roll without necessitating cutting of the same, the construction being such as to admit of the film being wound upon either one of two rolls at opposite ends of a frame, thereby obviating the necessity for removing the roll and replacing the same, as is necessary with printing frames as generally constructed for use in connection with a roll of films.

A further purpose of the invention is to combine with a printing frame novel means for securing the roll or spool upon which the film is wound and to combine therewith means for preventing a too rapid movement of the roll or spool, thereby preventing loosening of the film and insuring the same being taut under all conditions.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a front view of a printing frame embodying the invention. Fig. 2 is a rear view of the frame, parts being broken away. Fig. 3 is a longitudinal section of the frame on the line $x$—$x$ of Fig. 2. Fig. 4 is a transverse section on the line $y$—$y$ of Fig. 2. Fig. 5 is a detail view of an end portion of the frame showing the spool holding means spread or thrown outward to release the spool. Fig. 6 is a transverse section on the line $z$—$z$ of Fig. 2.

Corresponding and like parts are referred to in the following description and indicated in all the views of the drawings by the same reference characters.

The frame 1 may be of any material and size and is usually oblong and provided at opposite ends with holding means for the spools or rolls upon which the film is wound. A glass 2 is supported near the front portion of the frame so as to leave a space between its ends and the adjacent ends of the frame and in which spaces the spools or rolls are adapted to be placed. Inner shoulders 3 support glass 2 and may be provided in any manner, said shoulders terminating a short distance from the end bars of the frame so as not to interfere with the spool or the guide rolls 4, the latter being arranged adjacent to the ends of the glass 2 so as to prevent endwise movement thereof and projecting slightly beyond the inner side of the glass to prevent the film 5 from coming in contact with the sharp edges or corners of the glass.

A series of doors 6, 7 and 8 close the rear side of the frame opposite to the glass 2 and confine the film 5 between them and said glass. The door 7 is considerably larger than the doors 6 and 8 and occupies a central position, the end doors 6 and 8 being relatively small and designed to admit of inspecting the work during the operation of printing. Spring catches 9 coöperate with the doors 6, 7 and 8 to hold them closed and press them towards the glass 2. Each catch 9 consists of a flat spring connected at one end by means of a pivot fastening 10 to a side of the frame and having its opposite end provided with a projection for convenience of turning the catches when it is required either to secure or to release the door.

In order that the spring catches may exert a pressure upon the doors to hold the same closed, each of the doors is provided upon its outer side near its swinging end with an inclined portion 11 for the free end of the coöperating spring catch 9 to ride, so as to subject said catch to tension. The inner faces of the doors are closed or covered with felt or other soft material to insure a uniform pressure upon the film and the printing paper.

The spool holding means and adjunctive parts at each end of the frame are the same, being of duplicate construction, hence corresponding parts are designated by like reference numerals. Spindles 12 and 13 are mounted in side bars of the frame in transverse alinement so as to coincide with the axis of the spool or roll 14. The spindle 12 is mounted to receive a reciprocating movement only, whereas the spindle 13 is mounted both to turn and to slide and is supplied with a crank 15 for convenience of rotating the same to wind the film upon the spool or roll 14. A disk 16 is fast to the inner portion of the spindle 12 and is located a short distance from the extremity thereof so as to bear against the adjacent end of the spool or roll 14 and engage frictionally therewith.

A spring 17 normally exerts an inward pressure upon the spindle 12 to force the disk 16 against the end of the spool 14 and retard the rotation thereof so as to prevent loosening of the film. Spring 17 is of the flat type and is attached at one end to the frame and bears against the outer end of the spindle 12 at its opposite end. The spindle 13 is provided at its inner end with opposite extensions 18 to engage with notches in the adjacent end of the spool or roll 14 to insure rotation of said spool upon turning the crank 15. An elbow 19 has one member extended along the side of the frame and notched in its end to receive a flattened portion of the spindle 12 and prevent rotation thereof, the other member of said elbow being mounted in a guide in an end of the frame, so as to direct the elbow in its sliding movements. A link 20 connects one end of the elbow 19 with a disk 21 to insure a sliding movement of the elbow 19 upon turning the disk 21 to the right and to the left. An elbow 22 similar in construction to the elbow 19 and mounted in a like manner, has one member extended along the opposite side of the frame and engaged with the spindle 13, the other member of the elbow 22 being slidably mounted in a guide of an end bar of the frame. A link 23 connects the opposite end of the elbow 22 with disk 21. The outer longitudinal members of the elbows 19 and 22 engage with the spindles 12 and 13 to effect longitudinal movement thereof either to engage the spool or to release the same according to the direction of movement of the said elbows. For convenience of turning the disk 21 it is provided with a thumb piece 24. Upon turning the disk 21 in one direction, the elbows 19 and 22 are thrown outward, thereby disengaging the spindles 12 and 13 from the spool 14 or admitting of said spool being placed in position. Upon turning the disk 21 in the opposite direction, the elbows 19 and 22 are drawn inward, thereby causing the spindles 12 and 13 to engage with opposite ends of the spool 14 and hold the same in place.

A roll 25 is mounted in spring arms 26 and normally exerts a pressure upon the film 5 so as to confine the same between the spool and the roll. The roll 25 is covered with rubber or other material to prevent injury to the film. The roll 25 is located directly opposite to the spool 14 and between the guide roll 4 and the end bar of the frame and is mounted in bearings provided at the ends of the spring arms 26 and is located at the front side of the frame. The roll 25 supplements, in a measure, the action of the spring 17, that is, it exerts a pressure upon the roll to prevent loosening of the film.

After the film of a roll has been exposed and developed, it may be printed by fitting the roll between the spindles 12 and 13 at one end of the frame and drawing a length of the film from the roll and attaching the end to the roll at the opposite end of the frame. The sensitized paper is placed upon the film and held in place by closing the doors 6, 7 and 9. As the printing progresses, the film may be drawn from one roll or spool and wound upon the other by turning the crank 15. The film may be moved backward or forward by turning either one of the two spools or rolls. It is further noted that while the frame is particularly designed for printing from a roll of films, nevertheless, it may be advantageously used for printing from cuts or single films.

The roll 25 prevents unwinding of the film should the latter, from any cause, become loosened. The spring 17 serves to press both spindles 12 and 13 inward through the intermediate connections 19, 22, 20, 23 and 21, thereby insuring the firm gripping of the spool. A stop 27 is adapted to engage the thumb piece 24 and limit the movement of the same in one direction so as to hold the spindles 12 and 13 separate when it is required to remove a roll or place a new roll in position. It is to be understood that the spindles 12 and 13 and the parts cooperating therewith, may be advantageously employed in a camera or other position to admit of a spool being quickly placed in position or removed.

Having thus described the invention, what is claimed as new is:

1. In combination, a printing frame of the character specified, having shoulders extended inward from opposite sides, said shoulders terminating a distance from the ends of the frame, transverse guide rolls arranged opposite the extremities of said inner shoulders, a glass supported upon the said inner shoulders and coming between the said guide rolls and prevented from longitudinal movement thereby, and doors for confining the work to the glass and retaining the latter in place upon said shoulders and between the guide rolls.

2. In combination, a printing frame of the character set forth, adapted to receive spools at opposite ends upon which a film is adapted to be wound, spool engaging means at opposite ends of the frame, each of said means comprising transversely alined spindles, and manually operable means cooperating with the said spindles to effect positive and simultaneous movement thereof either in an outward or an inward direction either to release or to engage with the spool.

3. In combination, a printing frame of the character set forth, adapted to receive spools at opposite ends upon which a film is adapted to be wound, spool engaging means at opposite ends of the frame, each of said means comprising transversely alined spindles, engaging means for each of said spindles, and means for simultaneously moving said engaging means either outward or inward either to release the spool or to engage therewith.

4. In combination, a printing frame of the character set forth, adapted to receive spools at opposite ends upon which a film is adapted to be wound, spool engaging means at opposite ends of the frame, each of said means comprising transversely alined spindles, transversely slidable members having engagement with the respective spindles, means for positively and simultaneously moving said members either outward or inward.

5. In combination, a printing frame of the character set forth, adapted to receive spools at opposite ends upon which a film is adapted to be wound, spool engaging means at opposite ends of the frame, each of said means comprising transversely alined spindles, transversely slidable members having engagement with the respective spindles, a disk, means positively connecting said transversely slidable members with the disk, and means for turning said disk to effect positive movement of said members both outward and inward.

6. In combination, a printing frame of the character set forth, adapted to receive spools at opposite ends upon which a film is adapted to be wound, spool engaging means at opposite ends of the frame, each of said means comprising transversely alined spindles, elbows having one member engaged with a spindle and having the other member slidably mounted in a guide, and means for simultaneously moving said elbows inward or outward.

7. In combination, a printing frame of the character set forth, adapted to receive spools at opposite ends upon which a film is adapted to be wound, spool engaging means at opposite ends of the frame, each of said means comprising transversely alined spindles, a disk, links connecting the inner members of the elbows with said disks at opposite points, and means for turning the disk to move the elbows outward or inward.

In testimony whereof I affix my signature in presence of two witnesses.

NEWTON H. BAIRD. [L. S.]

Witnesses:
   WILLIAM C. BARTON,
   ERNEST B. FOSTER.